J. F. TAYLOR.
WHEEL.
APPLICATION FILED MAR. 31, 1917.
1,288,285.
Patented Dec. 17, 1918.
2 SHEETS—SHEET 1.
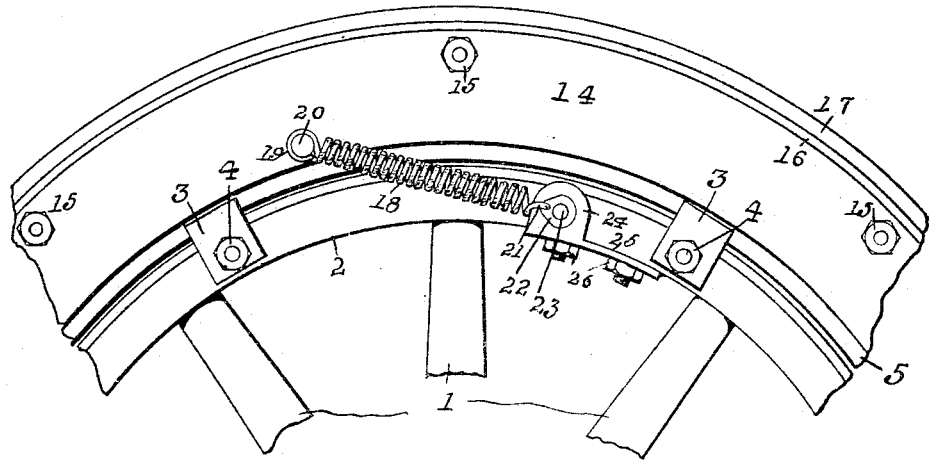
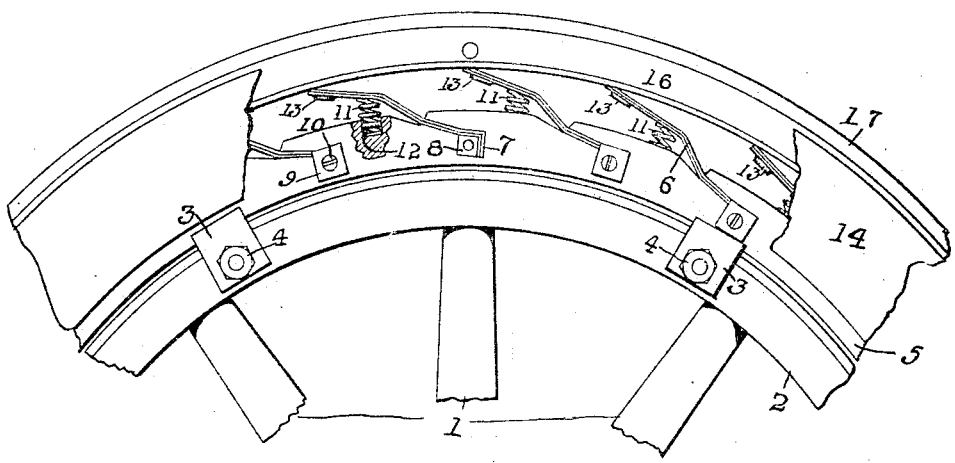

J. F. TAYLOR.
WHEEL.
APPLICATION FILED MAR. 31, 1917.
1,288,285.
Patented Dec. 17, 1918.
2 SHEETS—SHEET 2.
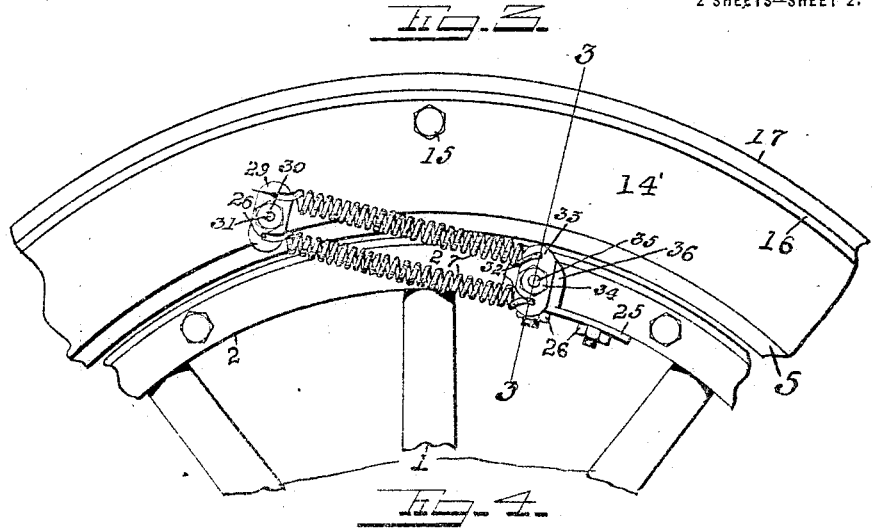
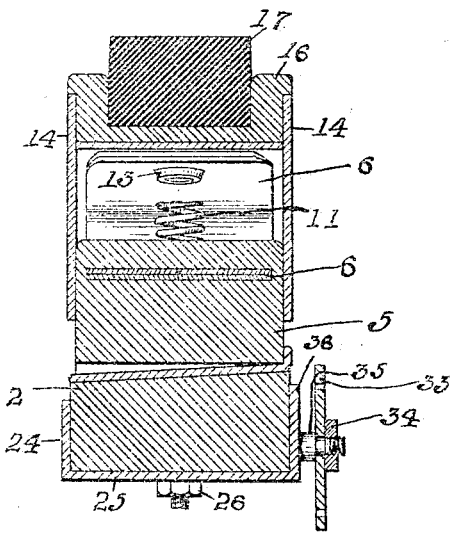
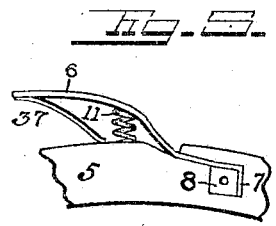
Witnesses
Ira M. Jones.
M. E. Moore
James F. Taylor
Inventor
By 
Attorney

UNITED STATES PATENT OFFICE.

JAMES F. TAYLOR, OF OMAHA, NEBRASKA.

WHEEL.

1,288,285.   Specification of Letters Patent.   Patented Dec. 17, 1918.

Application filed March 31, 1917. Serial No. 158,855.

*To all whom it may concern:*

Be it known that I, JAMES F. TAYLOR, a citizen of the United States, residing at Omaha, in the county of Douglas and State of Nebraska, have invented certain new and useful Improvements in Wheels, of which the following is a specification.

My invention relates to improvements in wheels and refers particularly to what may be termed a cushion or resilient wheel.

An object of my invention is the provision of a cushion or resilient wheel which will take the place of the pneumatic tire and by so doing dispense entirely with the annoyance of punctures or blow-outs encountered with the pneumatic tire.

Another object of my invention is the provision of a cushion or resilient wheel which will perform all the functions of a pneumatic tire and one which will be desirable on carriages, automobiles or in any place where a pneumatic tire is used.

A further object of my invention is the provision of a tire construction, which may be applied to the felly of the wheels now in use or at the time of manufacture, and one which will be simple, durable and inexpensive.

With these and other objects in view my invention consists of a cushion or resilient wheel embodying novel features of construction, combination and arrangement of parts for service, substantially as shown, described and particularly defined by the claims.

In the accompanying drawings, I have illustrated one complete example of the physical embodiment of my invention, constructed according to the best mode I have so far devised for the practical application of the principles of my invention.

Figure 1 is a side elevation of a portion of my wheel taken from one side thereof.

Fig. 2 is a similar view, partly broken away to show the interior details.

Fig. 3 is a side elevation of a portion of my wheel taken from the opposite side thereof.

Fig. 4 is a transverse sectional view taken on line 3—3 of Fig. 3, and

Fig. 5 is a modified form of spring used in cushioning my wheel.

In the preferred embodiment of my invention, I employ a wheel of the construction of those now in general use, having the spokes 1, the felly 2, and the means for securing the tire rim or in this case, my cushion wheel or tire, consisting of the lugs 3 and the binding nuts 4.

Secured on the felly 2, in the usual manner, is the band 5, having secured therein the flat springs 6, for cushioning the wheel. The springs 6 have their inner ends 7 bent at right angles and are secured in the band 5 by the blocks or wedges 8, held in position by the plates 9 and the binding screws 10.

To increase the resiliency of the flat springs 6, I provide the helical springs 11, having one end bearing against the underneath side of the flat springs and their other end secured in the openings 12 in the band 5. Thus it will be seen that this construction will withstand a heavy load, but in case the load should be too heavy and to prevent the springs 6 from being bent down to the band 5, I provide on the outer end of the springs 6, the lugs 13.

The springs are confined and protected by the circular plates 14 and 14', secured by nuts 15 to the outer rim 16, against which the springs 6 exert an outward pressure.

A rubber tread 17 is secured in the outer rim 16, to deaden the noise when the wheel is passing over rough pavements and to add to the resiliency of the wheel.

To prevent the outer rim from creeping around the band 5, I provide on one side the single coiled spring 18, having one end 19 secured to the stud 20, attached to the plate 14, and its other end 21 secured to the washer 22 pivoted on the pin 23 secured in the ear 24 of the plate 25, attached to the felly 2 by nuts 26.

On the opposite side, I provide the set of springs 27 having their ends 28 secured to the plate 29, pivotally attached by the nut 30, to the stud 31, secured in the plate 14', and their other ends 32, fastened to the plate 33, pivotally secured by the nut 34, to the pin 35, secured in the ear 36 of the plate 25.

I employ three or more sets of these springs and it will be readily seen that this construction securely prevents the outer rim from creeping around the band 5.

In the modified form shown in Fig. 5, the flat spring 6 has secured to its free end the spring 37, which bends inward and bears against the band 5, and thus greatly increases the resiliency and efficiency of the spring.

It will be readily seen that my wheel or tire construction affords all the desired resiliency and can be produced at a low price, all things considered, and in general prove highly efficient and practical.

I claim:—

1. The wheel herein shown and described, consisting of the felly, the band surrounding said felly and formed with inclined slots leading to square openings, flat springs having their intermediate portions fitting in said slots and having one end free and the other end formed with an angle bend fitting in said square openings, wedges fitting in the openings to engage and secure the angle-bent ends of the springs, cushions under the free ends of said flat springs, a tire mounting supported on said springs, and a pair of flat plates inclosing and confining the band, springs and tire mounting.

2. The wheel herein shown and described, consisting of the felly, the band surrounding said felly and formed with inclined slots leading to square openings, flat springs having their intermediate portions fitting in said slots and having one end free and the other end formed with an angle bend fitting in said square openings, wedges fitting in the openings to engage and secure the angle-bent ends of the springs, cushions under the free ends of said flat springs, a tire mounting supported on said springs, and a pair of flat plates inclosing and confining the band, springs and tire mounting, said plates being connected with the felly by springs having one end secured to studs on said plates and their other ends connected to plates attached to the felly.

In testimony whereof I affix my signature in the presence of two witnesses.

JAMES F. TAYLOR.

Witnesses:
J. W. MARTIN,
H. E. BYRNE.

Copies of this patent may be obtained for five cents each, by addressing the "Commissioner of Patents, Washington, D. C."